(12) United States Patent
Bedolla et al.

(10) Patent No.: US 8,643,604 B2
(45) Date of Patent: Feb. 4, 2014

(54) SEAMLESS BUTTON ARRAY PANELS FOR HANDHELD COMMUNICATION DEVICES

(75) Inventors: Jimmy Bedolla, Rolling Meadows, IL (US); David Szczypinski, Chicago, IL (US); Paul John Kudrna, Naperville, IL (US)

(73) Assignee: BlackBerry Limited, Waterloo (CA)

( * ) Notice: Subject to any disclaimer, the term of this patent is extended or adjusted under 35 U.S.C. 154(b) by 917 days.

(21) Appl. No.: 12/638,291

(22) Filed: Dec. 15, 2009

(65) Prior Publication Data
US 2011/0141028 A1 Jun. 16, 2011

(51) Int. Cl.
*G06F 3/02* (2006.01)

(52) U.S. Cl.
USPC ............ 345/169; 345/168; 708/109; 708/145

(58) Field of Classification Search
USPC .................................. 345/168; 708/109, 145
See application file for complete search history.

(56) References Cited

U.S. PATENT DOCUMENTS

| | | | |
|---|---|---|---|
| 4,716,262 A | 12/1987 | Morse | |
| 5,359,658 A | 10/1994 | Goodson | |
| 7,030,857 B2 | 4/2006 | O'Keefe | |
| 7,858,891 B2 | 12/2010 | Strohband et al. | |
| 2003/0201983 A1* | 10/2003 | Jokinen et al. | 345/169 |
| 2003/0223799 A1* | 12/2003 | Pihlaja | 400/490 |
| 2005/0024240 A1* | 2/2005 | Fyke et al. | 341/22 |
| 2005/0130721 A1* | 6/2005 | Gartrell | 455/575.8 |
| 2005/0174332 A1* | 8/2005 | Hunag et al. | 345/168 |
| 2006/0181506 A1 | 8/2006 | Fyke | |
| 2006/0243267 A1* | 11/2006 | Nakajima et al. | 126/25 R |
| 2007/0036351 A1* | 2/2007 | Yang et al. | 379/433.13 |
| 2007/0074965 A1 | 4/2007 | Chuang | |
| 2007/0227866 A1 | 10/2007 | Dimig | |
| 2007/0247420 A1 | 10/2007 | Strohband et al. | |
| 2008/0018606 A1* | 1/2008 | Chen | 345/169 |
| 2008/0264535 A1* | 10/2008 | Yu et al. | 150/165 |
| 2009/0159412 A1* | 6/2009 | Liu et al. | 200/302.3 |
| 2009/0236206 A1* | 9/2009 | Wennemer et al. | 200/302.2 |
| 2009/0320276 A1* | 12/2009 | Wu et al. | 29/622 |

FOREIGN PATENT DOCUMENTS

WO 2009109875 9/2009

OTHER PUBLICATIONS

European Search Report dated May 21, 2010. In corresponding application No. 09179353.9.
European Examination Report dated Dec. 13, 2010. In corresponding application No. 09179353.9.
Communication Pursuant to Article 94(3) EPC from related European Patent Application No. 09179353.9; 5 pages.

* cited by examiner

*Primary Examiner* — Lixi C Simpson
(74) *Attorney, Agent, or Firm* — Fitch, Even, Tabin & Flannery LLP

(57) ABSTRACT

A button array panel for a handheld communication device. The button array panel can include buttons and a continuous and seamless layer covering each button. Each button has an associated function and full recovery. A substrate layer can also be provided and can be interposed between the buttons and continuous and seamless layer. The button array panel can be a side button array panel or a keypad button array panel. The button array panel can prevent material, such as dust or liquid, from penetrating the handheld communication device.

15 Claims, 8 Drawing Sheets

SEAMLESS BUTTON ARRAY PANELS FOR HANDHELD COMMUNICATION DEVICES

FIELD OF TECHNOLOGY

The present disclosure relates generally to buttons for handheld communication devices. More specifically, the present disclosure relates to seamless button array panels for handheld communication devices.

BACKGROUND

With the advent of more robust mobile electronic systems, advancements of handheld communication devices are becoming more prevalent. Handheld communication devices can provide a variety of functions including, for example, telephonic, electronic messaging and other personal information manager (PIM) application functions. Handheld communication devices include mobile stations such as simple cellular telephones, smart telephones, wireless PDAs, wired PDAs, and reduced-sized laptop computers.

Such handheld communication devices allow the user to enter data into text messages, email messages, address books, calendars, task lists, and other similar text files. To facilitate the operation of the devices, buttons and keypads are used. Typically, such buttons and keys extend out of openings and are elevated with respect to the surfaces of the devices. As a result, the openings provide a conduit for foreign material, such as liquids or dust, to enter the devices. In addition, during manufacturing of the devices, the buttons and keypads are constructed using a plurality of components which can require precision manufacturing and assembly. Imprecision can lead to a loss of tactility due to misalignment of the multiple parts, noisy buttons, or any combination thereof.

BRIEF DESCRIPTION OF THE DRAWINGS

Embodiments of the present application will now be described, by way of example only, with reference to the attached Figures, wherein.

DETAILED DESCRIPTION

Figure 1A:
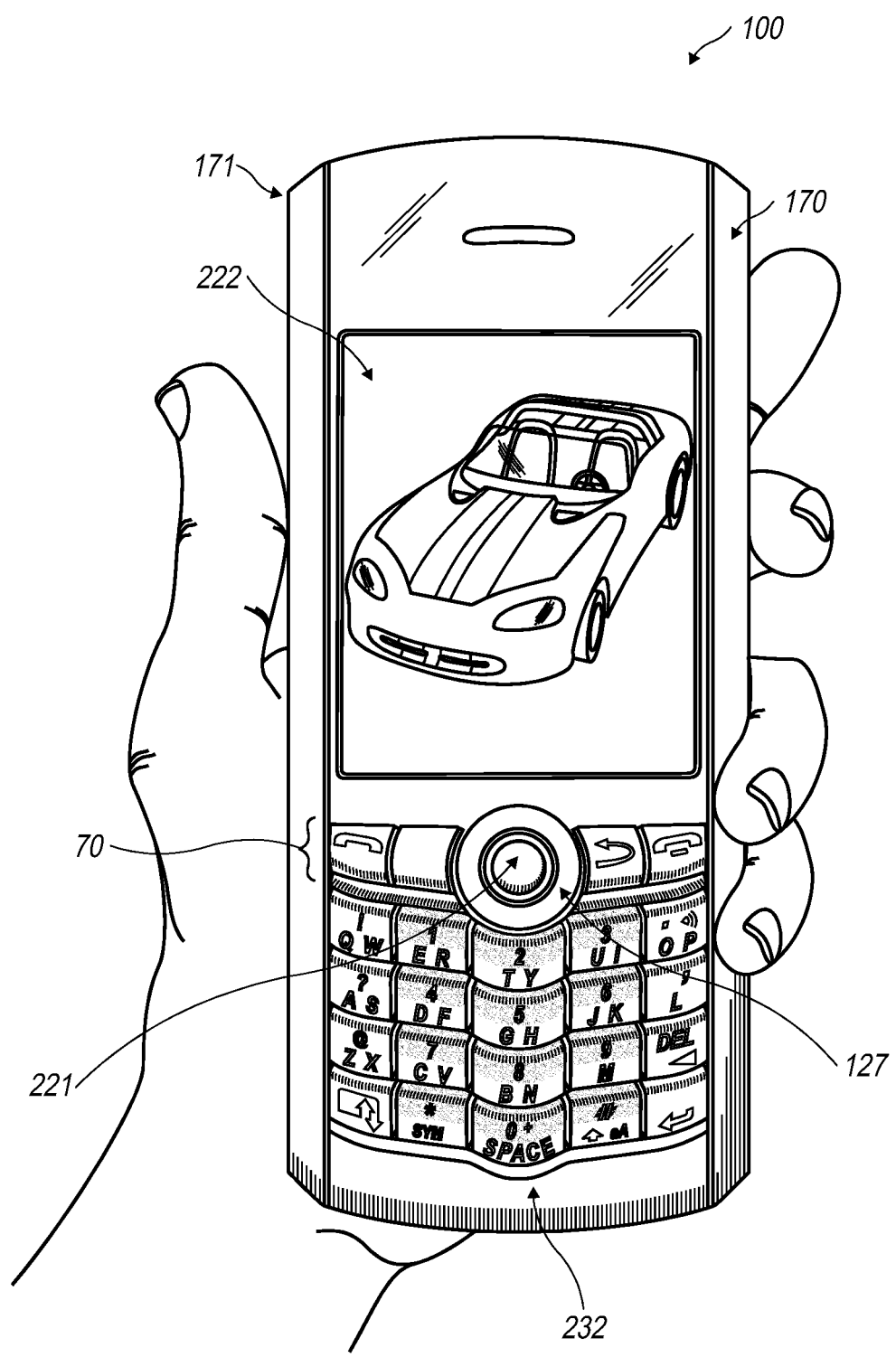
FIG. 1A is a front view of a handheld communication device having a reduced QWERTY keyboard in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Figure 1B:
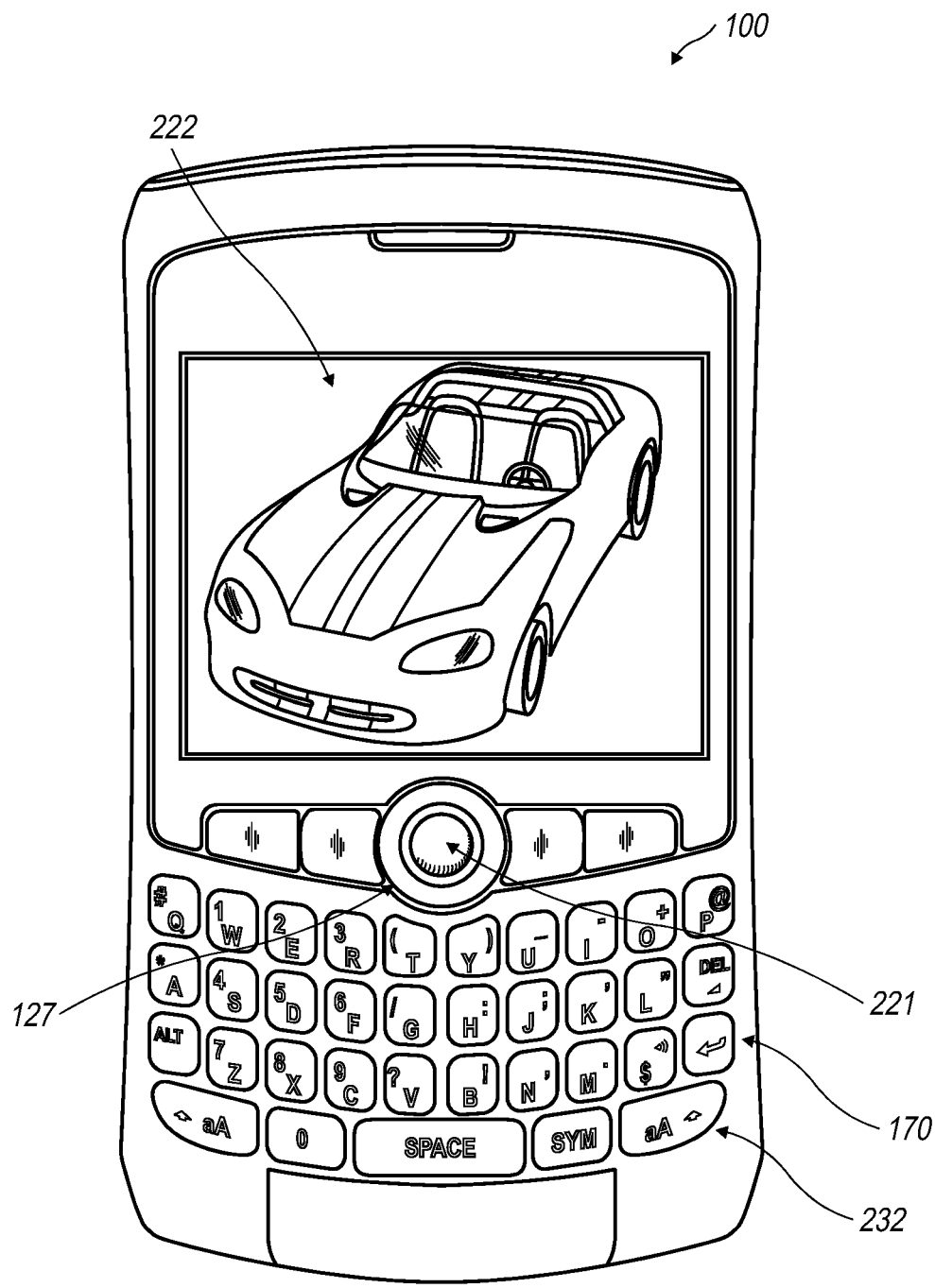
FIG. 1B is a front view of a handheld communication device having a full QWERTY keyboard in accordance with an exemplary embodiment.

Referring to FIGS. 1A and 1B, front views of handheld or electronic communication devices 100 having a reduced QWERTY keyboard and a full QWERTY keyboard, respectively, with each capable of incorporating a messaging application in accordance with exemplary embodiments are illustrated. Each key of the keyboard 232 can be associated with at least one indicia representing an alphabetic character, a numeral, or a command (such as a space command, return command, or the like). The plurality of the keys having alphabetic characters are arranged in a standard keyboard layout. This standard keyboard layout can be a QWERTY layout (shown in FIGS. 1A and 1B), a QZERTY layout, a QWERTZ layout, an AZERTY layout, a Dvorak layout, a Russian keyboard layout, a Chinese keyboard layout, or other similar layout. These standard layouts are provided by way of example and other similar standard layouts are considered within the scope of this disclosure. The keyboard layout can be based on the geographical region in which the handheld device is intended for sale. In some examples, the keyboard can be interchangeable such that the user can switch between layouts.

Figure 2:
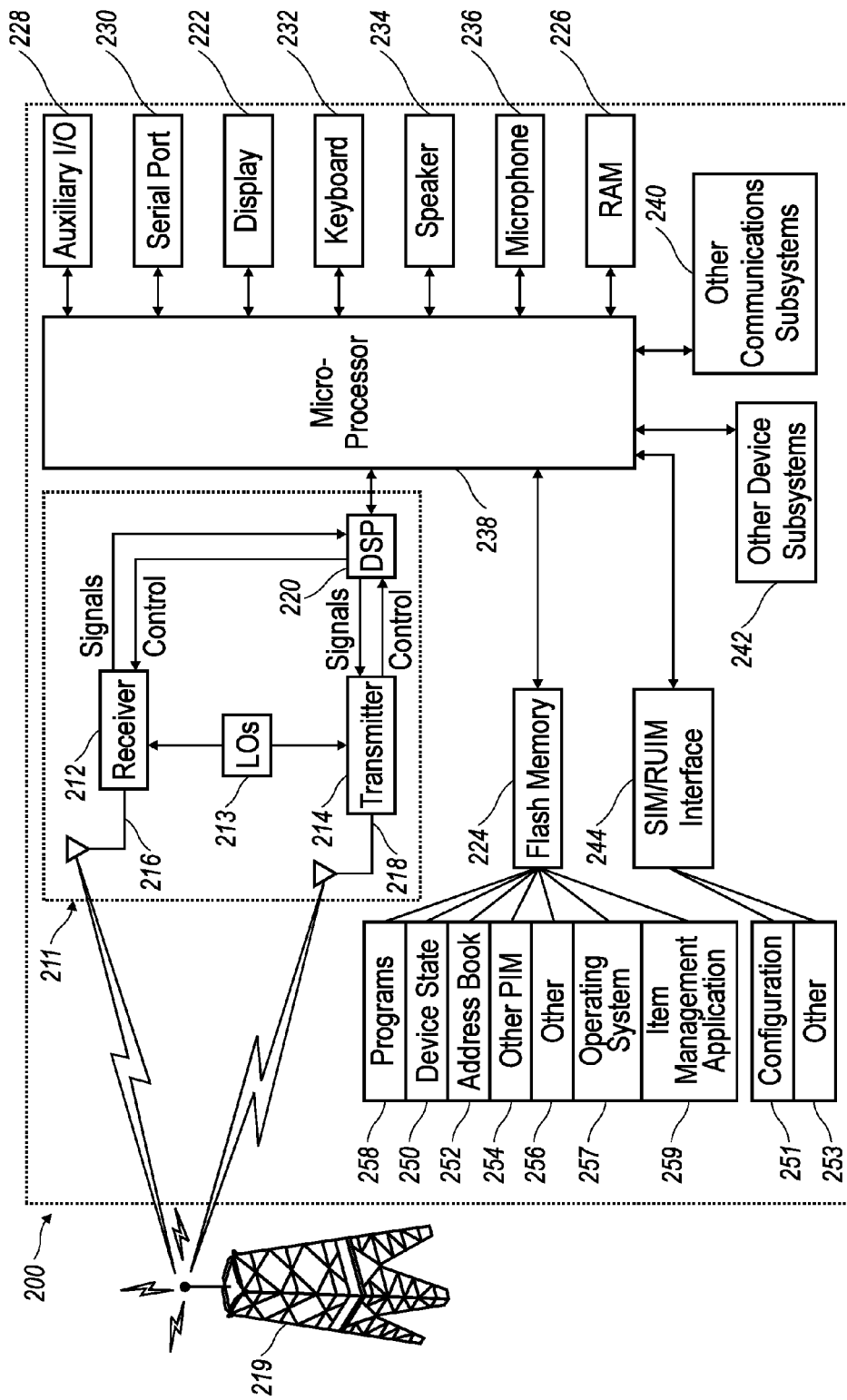
FIG. 2 is a block diagram representing a handheld communication device interacting in a communication network in accordance with an exemplary embodiment.

As shown, the exemplary communication devices 100 are communicatively coupled to a wireless network 219 as exemplified in the block diagram of FIG. 2. These figures are exemplary only, and those persons skilled in the art will appreciate that additional elements and modifications may be necessary to make the communication device 100 work in particular network environments. While in the illustrated embodiments, the communication devices 100 are smart phones, however, in other embodiments, the communication devices 100 may be personal digital assistants (PDA), laptop computers, desktop computers, servers, or other communication device capable of sending and receiving electronic messages.

Referring to FIG. 2, a block diagram of a communication device in accordance with an exemplary embodiment is illustrated. As shown, the communication device 100 includes a microprocessor 238 that controls the operation of the communication device 100. A communication subsystem 211 performs all communication transmission and reception with the wireless network 219. The microprocessor 238 further can be communicatively coupled with an auxiliary input/output (I/O) subsystem 228 which can be communicatively coupled to the communication device 100. Additionally, in at least one embodiment, the microprocessor 238 can be communicatively coupled to a serial port (for example, a Universal Serial Bus port) 230 which can allow for communication with other devices or systems via the serial port 230. A display 222 can be communicatively coupled to microprocessor 238 to allow for displaying of information to an operator of the communication device 100. When the communication device 100 is equipped with a keyboard 232, the keyboard can also be communicatively coupled with the microprocessor 238. The communication device 100 can include a speaker 234, a microphone, 236, random access memory (RAM) 226, and flash memory 224 all of which may be communicatively coupled to the microprocessor 238. Other similar components may be provided on the communication device 100 as well and optionally communicatively coupled to the microprocessor 238. Other communication subsystems 240 and other communication device subsystems 242 are generally indicated as being functionally connected with the microprocessor 238 as well. An example of a communication subsystem 240 is that of a short range communication system such as BLUETOOTH® communication module or a WI-FI® communication module (a communication module in compliance with IEEE 802.11b) and associated circuits and components. Additionally, the microprocessor 238 is able to perform operating system functions and enables execution of programs on the communication device 100. In some embodiments not all of the above components may be included in the communication device 100. For example, in at least one embodiment the keyboard 232 is not provided as a separate component and is instead integrated with a touchscreen as described below.

The auxiliary I/O subsystem 228 can take the form of a variety of different navigation tools 127 (multi-directional or single-directional) such as a trackball navigation tool 221 as illustrated in the exemplary embodiment shown in FIGS. 1A and 1B, or a thumbwheel, an optical trackpad, a navigation pad, a joystick, touch-sensitive interface, or other I/O interface. These navigation tools 127 may be located on the front surface of the communication device 100 or may be located on any exterior surface of the communication device 100. Other auxiliary I/O subsystems can include external display devices and externally connected keyboards (not shown). While the above examples have been provided in relation to the auxiliary I/O subsystem 228, other subsystems capable of providing input or receiving output from the communication device 100 are considered within the scope of this disclosure. Additionally, other keys may be placed along the side of the communication device 100 to function as escape keys, volume control keys, scrolling keys, power switches, or user programmable keys, and may likewise be programmed accordingly.

As may be appreciated from FIGS. 1A and 1B, the communication device 100 comprises the lighted display 222 located above the keyboard 232 constituting a user input and suitable for accommodating textual input to the communication device 100. The front face 170 of the communication device 100 has a navigation row 70. As shown, the communication device 100 is of unibody construction, also known as a "candy-bar" design. In alternate embodiments, the communication device 100 can be "clamshell" or a "slider" design.

As described above, the communication device 100 may include the auxiliary input 228 that acts as a cursor navigation tool and which can be also exteriorly located upon the front face 170 of the communication device 100. Its front face location allows the tool to be easily thumb-actuable like the keys of the keyboard 232. An embodiment provides the navigation tool 127 in the form of the trackball 221, which can be utilized to instruct two-dimensional screen cursor movement in substantially any direction, as well as act as an actuator when the trackball 221 is depressed like a button. The placement of the navigation tool 127 may be above the keyboard 232 and below the display screen 222; here, it can avoid interference during keyboarding and does not block the operator's view of the display screen 222 during use, e.g., as shown in FIGS. 1A and 1B.

As illustrated in FIGS. 1A and 1B, the communication device 100 may be configured to send and receive messages. The communication device 100 includes a body 171 which may, in some embodiments, be configured to be held in one hand by an operator of the communication device 100 during text entry. The display 222 is included which is located on the front face 170 of the body 171 and upon which information is displayed to the operator during text entry. The communication device 100 may also be configured to send and receive voice communications such as mobile telephone calls. The communication device 100 may also include a camera (not shown) to allow the user to take electronic photographs which can be referred to as photos or pictures.

Furthermore, the communication device 100 is equipped with components to enable operation of various programs, as shown in FIG. 2. In an exemplary embodiment, the flash memory 224 is enabled to provide a storage location for the operating system 257, device programs 258, and data. The operating system 257 is generally configured to manage other programs 258 that are also stored in memory 224 and executable on the processor 238. The operating system 257 honors requests for services made by programs 258 through predefined program 258 interfaces. More specifically, the operating system 257 typically determines the order in which multiple programs 258 are executed on the processor 238 and the execution time allotted for each program 258, manages the sharing of memory 224 among multiple programs 358, handles input and output to and from other device subsystems 242, and so on. In addition, operators can typically interact directly with the operating system 257 through a user interface usually including the keyboard 232 and display screen 222. While in an exemplary embodiment the operating system 257 is stored in flash memory 224, the operating system 257 in other embodiments is stored in read-only memory (ROM) or similar storage element (not shown). As those skilled in the art will appreciate, the operating system 257, device program 258 or parts thereof may be loaded in RAM 226 or other volatile memory.

When the communication device 100 is enabled for two-way communication within the wireless communication network 219, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 may require a unique identifier to enable the communication device 100 to transmit and receive signals from the communication network 219. Other systems may not require such identifying information. GPRS, UMTS, and EDGE use a Subscriber Identity Module (SIM) in order to allow communication with the communication network 219. Likewise, most CDMA systems use a Removable Identity Module (RUIM) in order to communicate with the CDMA network. The RUIM and SIM card can be used in multiple different communication devices 100. The communication device 100 may be able to operate some features without a SIM/RUIM card, but it will not be able to communicate with the network 219. A SIM/RUIM interface 244 located within the communication device 100 allows for removal or insertion of a SIM/RUIM card (not shown). The SIM/RUIM card features memory and holds key configurations 251, and other information 253 such as identification and subscriber related information. With a properly enabled communication device 100, two-way communication between the communication device 100 and communication network 219 is possible.

If the communication device 100 is enabled as described above or the communication network 219 does not require such enablement, the two-way communication enabled communication device 100 is able to both transmit and receive information from the communication network 219. The transfer of communication can be from the communication device 100 or to the communication device 100. In order to communicate with the communication network 219, the communication device 100 in the presently described exemplary embodiment is equipped with an integral or internal antenna 218 for transmitting signals to the communication network 219. Likewise the communication device 100 in the presently described exemplary embodiment is equipped with another antenna 216 for receiving communication from the communication network 219. These antennae (216, 218) in another exemplary embodiment are combined into a single antenna (not shown). As one skilled in the art would appreciate, the antenna or antennae (216, 218) in another embodiment are externally mounted on the communication device 100.

When equipped for two-way communication, the communication device 100 features the communication subsystem 211. As is understood in the art, this communication subsystem 211 is modified so that it can support the operational needs of the communication device 100. The subsystem 211 includes a transmitter 214 and receiver 212 including the associated antenna or antennae (216, 218) as described above, local oscillators (LOs) 213, and a processing module 220 which in the presently described exemplary embodiment is a digital signal processor (DSP) 220.

It is contemplated that communication by the communication device 100 with the wireless network 219 can be any type of communication that both the wireless network 219 and communication device 100 are enabled to transmit, receive and process. In general, these can be classified as voice and data. Voice communication generally refers to communication in which signals for audible sounds are transmitted by the communication device 100 through the communication network 219. Data generally refers to all other types of communication that the communication device 100 is capable of performing within the constraints of the wireless network 219.

The keyboard 232 can include a plurality of keys that can be of a physical nature such as actuable buttons, or they can be of a software nature, typically constituted by virtual representations of physical keys on the display screen 222 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 222, which in one embodiment is enabled by touching the display screen 222, for example, with a stylus, finger, or other pointer, to generate the character or activate the indicated command or function. Some examples of display screens 222 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular program or feature of the communication device 100 is shown on the display screen 222 in the same configuration as the physical keys. Using this configuration, the operator can select the appropriate physical key corresponding to what is shown on the display screen 222. Thus, the desired character, command or function is obtained by depressing the physical key corresponding to the character, command or function displayed at a corresponding position on the display screen 222, rather than touching the display screen 222.

While the above description generally describes the systems and components associated with a handheld communication device, the communication device 100 could be another communication device such as a PDA, a laptop computer, desktop computer, a server, or other communication device. In those embodiments, different components of the above system might be omitted in order provide the desired communication device 100. Additionally, other components not described above may be required to allow the communication device 100 to function in a desired fashion. The above description provides only general components and additional components may be required to enable the system to function. These systems and components would be appreciated by those of ordinary skill in the art.

Figure 3:
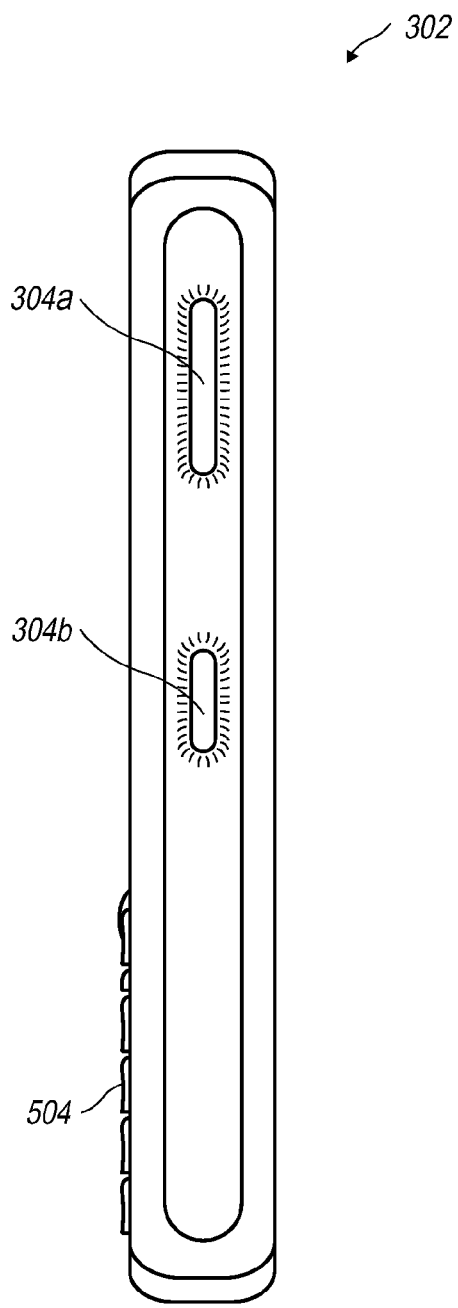
FIG. 3 is a side view of a side button array panel for a handheld communication device in accordance with an exemplary embodiment.
Figure 4:
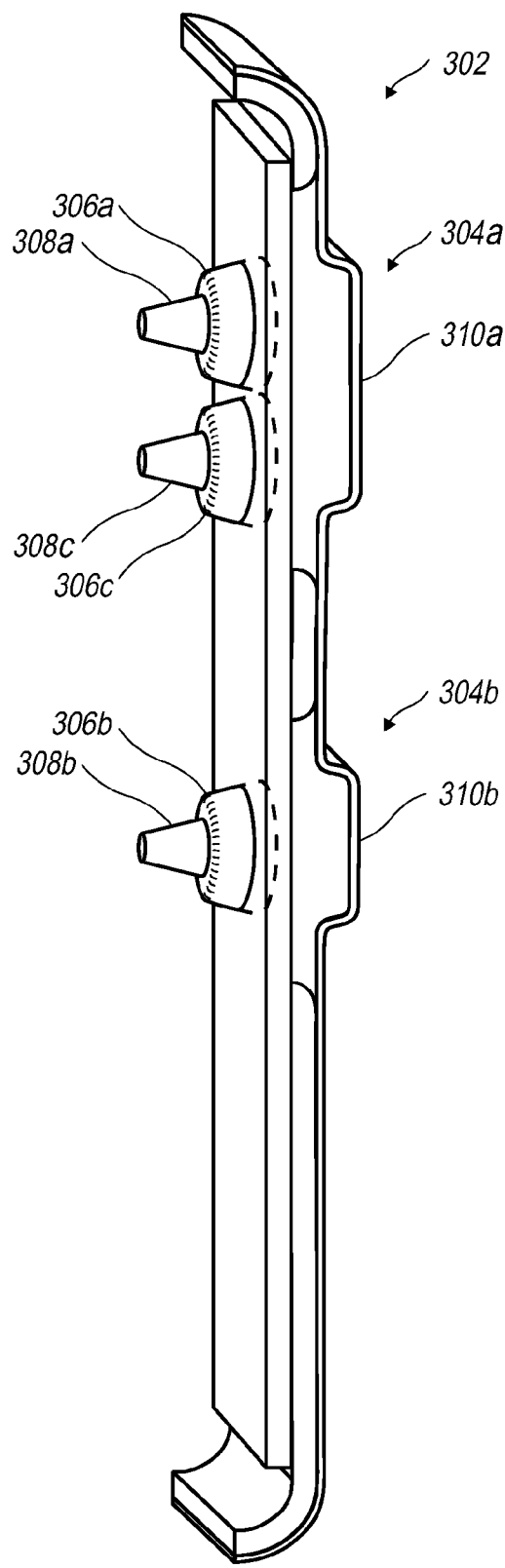
FIG. 4 is a perspective view of a side button array panel for a handheld communication device in accordance with an exemplary embodiment.

Referring to FIGS. 3 and 4, a side view and a perspective view of a side button array panel 302 for a handheld communication device in accordance with exemplary embodiments are illustrated. As shown, the side button array panel 302 can include one or more buttons 304 with each button 304 having one or more associated functions, e.g., a volume control button 304a for controlling the volume and an enter button 304b for entering data. In other embodiments, the side button array panel 302 can include more or less buttons 304 having one or more functions associated with each button 304.

Figure 5:
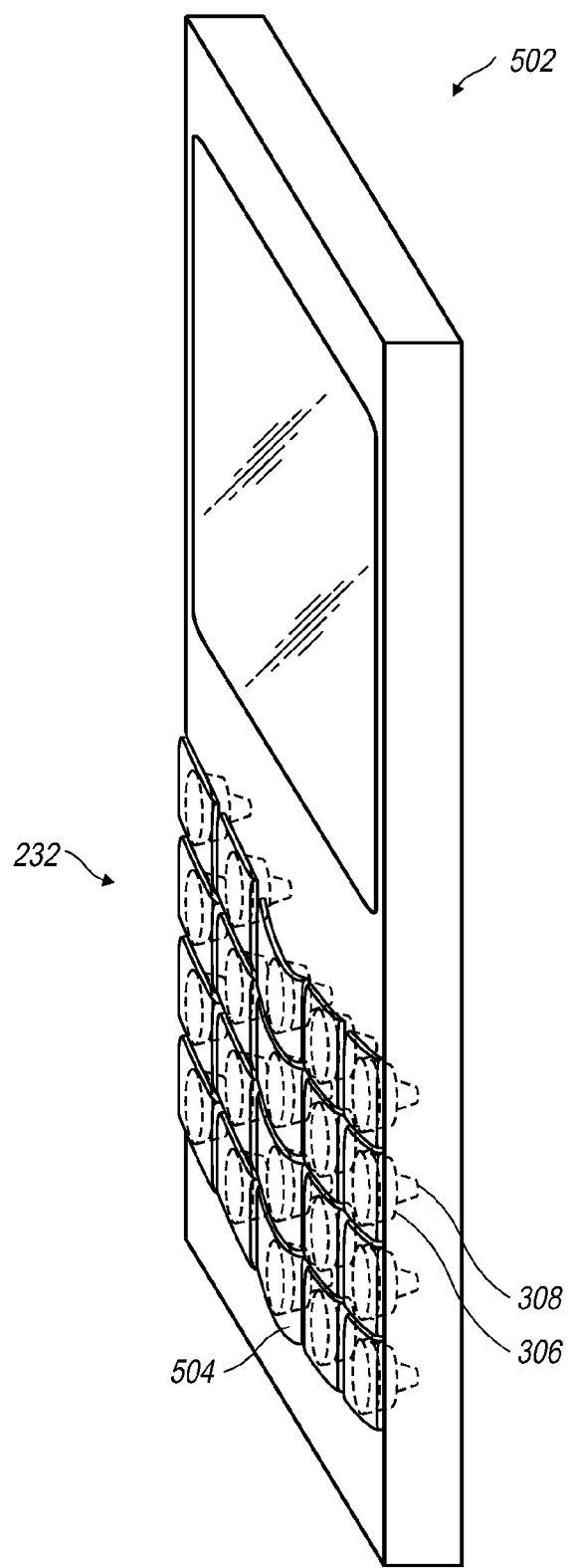
FIG. 5 is a perspective view of a keypad button array panel for a handheld communication device in accordance with an exemplary embodiment.

Referring to FIG. 5 a perspective view of a keypad button array panel 502 for a handheld communication device in accordance with an exemplary embodiment is illustrated. As shown, the keypad button array panel 502 can include a keypad or keyboard 232 having one or more keys 504 to enter data, with each key having one or more associated letters, numbers, symbols, functions (e.g., space, enter, shift), or any combination thereof. For example, the top left data key of the handheld communication device 100 shown in FIG. 1a, has three associated entries, the number "1", the letter "q" and the letter "w".

Figure 6:
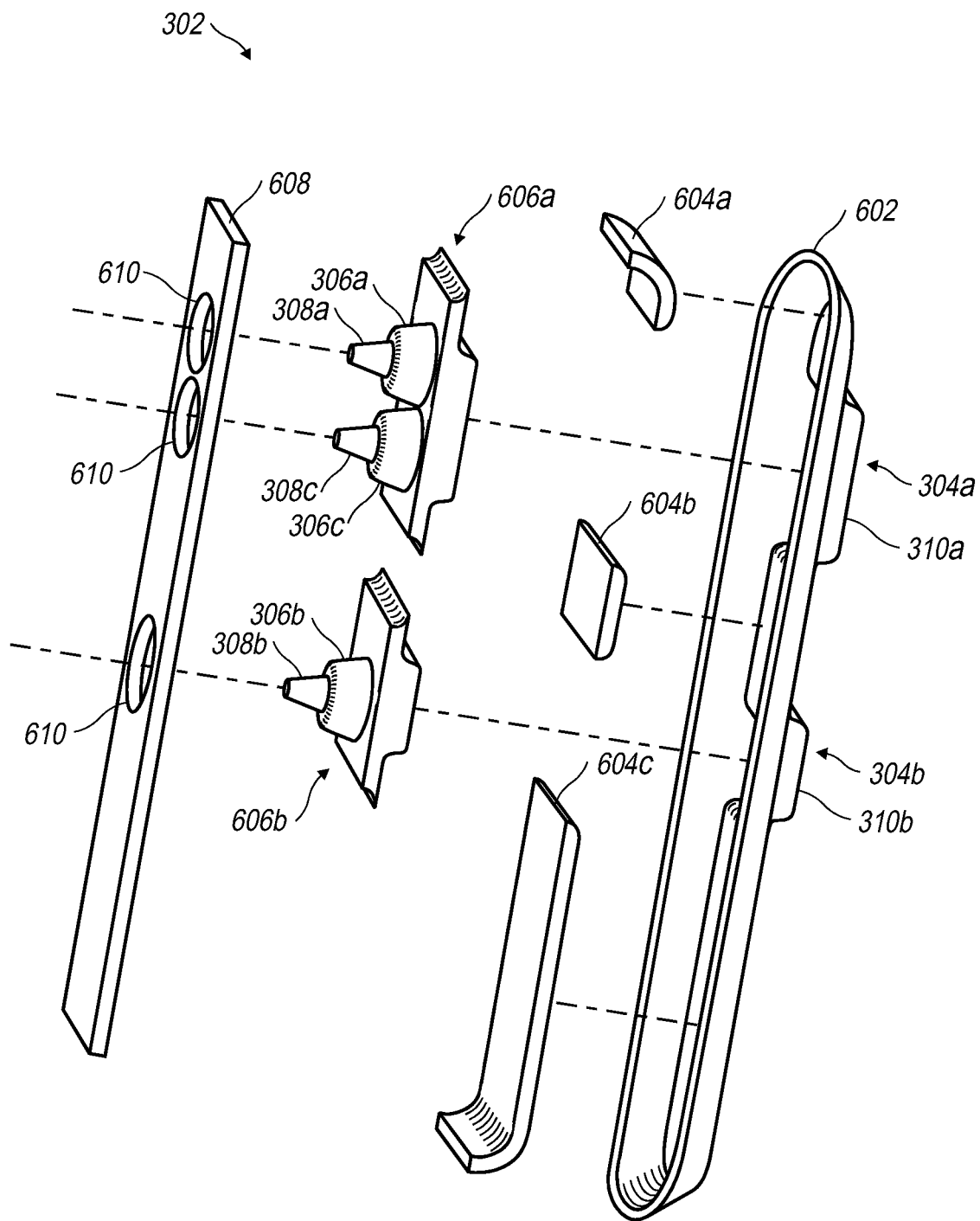
FIG. 6 is an exploded view of the side button array panel shown in FIG. 4 for a handheld communication device in accordance with an exemplary embodiment.
Figure 7:
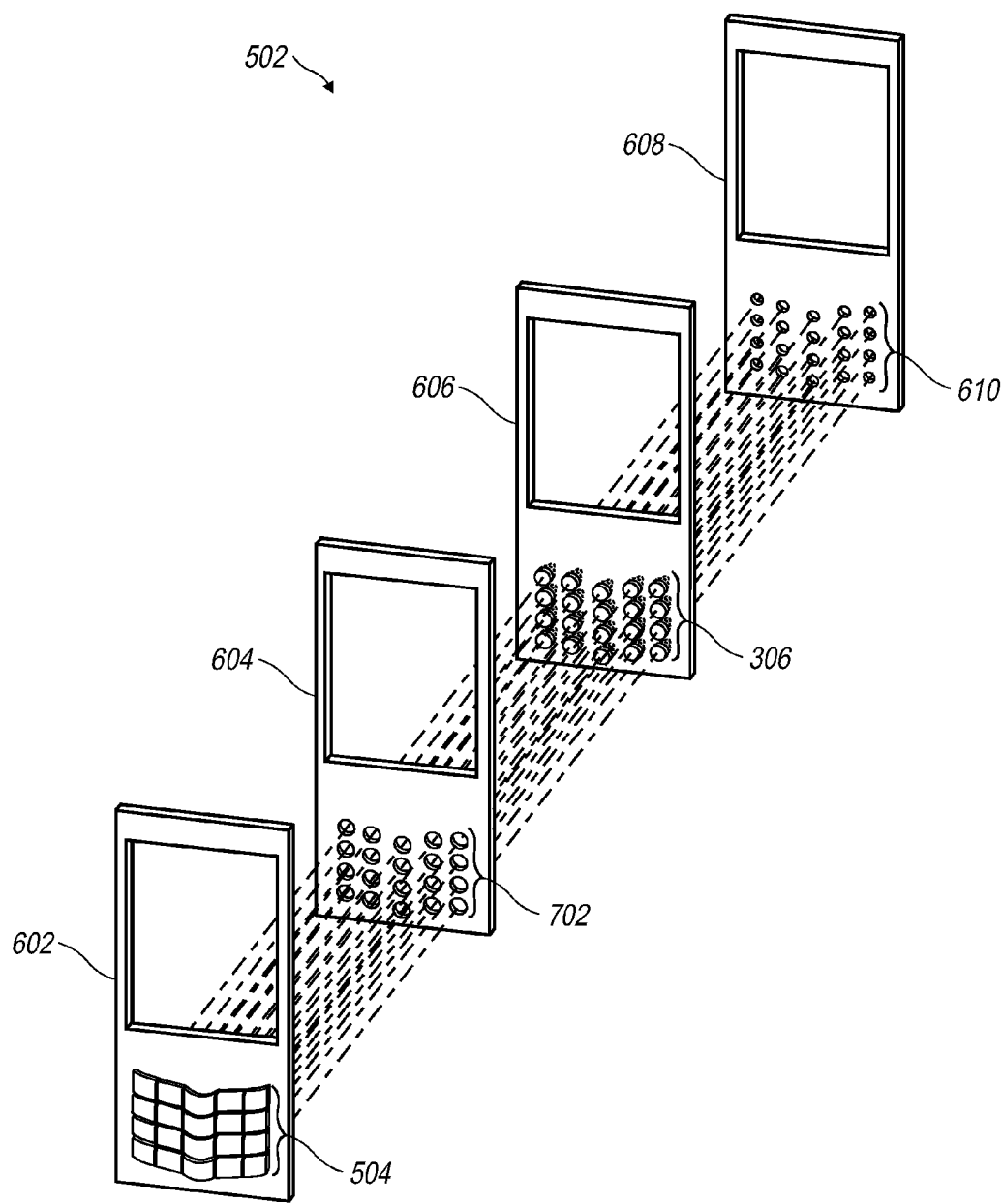
FIG. 7 is an exploded view of the keypad button array panel shown in FIG. 5 for a handheld communication device in accordance with an exemplary embodiment.

Referring to FIGS. 6 and 7, exploded views of the side button array panel 302 and keypad button array panel 502 for handheld communication devices in accordance with exemplary embodiments are illustrated, respectively. As shown, each button array panel 302, 502 can include a top layer 602 that covers a substrate layer 604, which is described below in further detail. The top layer 602 can provide a continuous, seamless layer cover for the button array panel 302, 502. The top layer 602 can extend over the length of the button array panel 302, 502 thereby ensuring there are no openings on the side or front of the handheld communication device 100. Without any openings on the button array panel 302, 502, foreign material, such as dust, liquid, or other contaminates, cannot penetrate the button array panel 302, 502. Preventing material from penetrating the button array panel 302, 502 assists in preventing a foreign material from interfering with the operation of the handheld communication device 100 or damaging the handheld communication device 100.

The top layer 602 can be, but not limited to, an in mold label (IML), film, foil, plated, flexible plating (e.g., non-conductive vacuum metallization), painted, flexible paint, plastic, laminated, urethane such as a thermoplastic urethane, rubber silicon, elastomeric, etc. The top layer 602 can have one or more finishes, e.g., aluminum, chrome, textured, metallic, smooth, rubber, dyed, colored, painted, or any combination thereof. For example, the top layer 602 can be physically plated with a metal coat. In one or more embodiments, the top layer 602 can be made of an elastomeric material. By using an elastomeric material, the top layer 602 can be deflect resistant or have improved impact absorption.

As shown in FIG. 6, the buttons 304 of the top layer 602 can include a button area or button exterior 310. The button exterior 310 is the area where a user presses to activate the button 304 under the top layer 602. For example, a user can press button exterior 310a of button 304a to increase or decrease the volume of the handheld communication device 100. In another example, the user can press the button exterior 310b of button 304b to enter data in the handheld communication device 100. In order to allow the button 304 to be pressed, the top layer 602, including the button exterior 310, can be made of an elastomeric material which is flexible thereby allowing the button 304 to be pressed.

As shown in FIG. 7, the top layer 602 can include keys or a keypad area 504. The keys 504 can be part of the top layer 602 which is a continuous, seamless layer. As shown, each key 504 of the top layer 602 can be shaped. In other embodiments, the top layer 602 can be flat without providing shapes for each key 504. In order to allow the keys 504 to be pressed, the keys 504 and the top layer 602 can be made of an elastomeric material which is flexible thereby allowing the key 504 to be pressed.

The top layer 602 can be clear or transparent. Having a clear or transparent top layer 602 allows indicia (representing the letters, numbers and symbols) on the buttons 304 or keys 504 to be visible. Alternatively, the top layer 602 can include indicia for the buttons 304 or keys 504. In yet another embodiment, the indicia can be on both the buttons 304 or keys 504 and on the top layer 602.

Referring to FIGS. 6 and 7 again, as shown, each button array panel, e.g., the side button array panel 302 and the keypad button array panel 502, can include a substrate layer 604. The substrate layer 604 can include multiple pieces or can be a single piece. For example, the substrate layer 604 shown in FIG. 6 can include multiple pieces 604a, 604b, 604c and the substrate layer 604 can be a single piece having one or more openings 702 as shown in FIG. 7. The openings 702 can allow the substrate layer 604 to receive part, e.g., the underside, of a key 504. For example, a key 504 can include an actuator 306 having a plunger tip 308 with the actuator 306, plunger tip 308, or both extending through an opening 702 of the substrate layer 604.

The substrate layer 604 can be made of, but not limited to, plastic, thermoplastic, rubber, metal, or any combination thereof. The substrate layer 604 can assist in fastening the button array panel 302, 502 to the handheld communication device 100. For example, the substrate layer 604 can include mechanisms, such as, but not limited to, bosses, screws, snaps or heat stakes, to attach the substrate layer 604 to one or more parts of the handheld communication device 100.

Each distal end of the substrate layer 604, e.g., the distal end of substrate layers 604a, 604c, can be curved. By curving (or having a radius) the distal ends of the substrate layers 604, the substrate layer 604 can provide the top layer 602 a flex point to assist in preventing cracking, e.g., stress cracking, discoloring, assist in rolling over, sheering over, and distributing (evenly) load forces. For example, the substrate layer 604 can have a radius, e.g., the distal ends of the substrate layer 604a, 604c in FIG. 6 with the radius providing a flex point for the top layer 602.

Referring to FIGS. 6 and 7 again, as shown, each button array panel, e.g., the side button array panel 302 and the keypad button array panel 502, can include a button layer 606.

The button layer 606 can include multiple pieces 606a, 606b as shown in FIG. 6 or can be a single piece 606 as shown in FIG. 7. As shown in FIG. 6, each piece 606a, 606b can include one or more actuators 306, e.g., button actuators. The button layer 606 can include at least one actuator 306 for each button 304 and key 504. Each actuator 306 can include a plunger or plunger tip 308 which interacts with one or more switches or contacts (not shown), e.g., a dome contact, to initiate a function in response to the button 304 being pressed. For example, in FIG. 6, the volume control button 304a can include an exterior area 310a where a user can press to actuate volume control button 304a. The volume control button 304a can include an upper end for raising the volume and a lower end for lowering the volume of the handheld communication device 100. The upper end of the volume control button 304a can include an actuator 306a with a plunger tip 308a. The lower end of the volume control button 304a can include an actuator 306c with a plunger tip 304c. When the user presses the upper end of exterior area 310a, the plunger tip 308a of button 304a can interact with a switch or contact causing the volume of the handheld communication device 100 to be raised. When the user presses the lower end of exterior area 310a, the plunger tip 308c of button 304a can interact with a switch or contact causing the volume of the handheld communication device 100 to be lowered. In another example, in FIG. 6, the data entry button 304b has an exterior area 310b which when a user presses results in the corresponding actuator 306b moving with the plunger tip 308b interacting with a switch or contact thereby causing data to be entered in the handheld communication device 100. As shown in FIGS. 5 and 7, each key 504 of the keypad button array panel 502 can have a corresponding actuator 306 and plunger tip 308.

Each button 304 or key 504 can be made of an elastomeric material, such as, but not limited to, silicon. Each button 304 or key 504 can be made of a single material, e.g., silicon, with the actuator 306 being made in a first shot and the plunger tip 308 being made in a second shot. In one or more embodiments, each button 304 or key 504 can be made of different materials. For example, the actuator 306 can be made of a first material in a first shot and the plunger tip 308 can be made of a second material in a second shot. Thus, the buttons 304 and keys 504 can be made using injection moldings which can be cheaper compared to some conventional manufacturing methods. Each button 304 and key 504 can be collapsible and have full recovery, e.g., after pressing the button 304, the button 304 returns to its original position.

The buttons 304 or keys 504 can be made in (e.g., in a mold process) and the substrate layer 604 or parts of the substrate layer 604a, 604b, 604c, can be made in a separate mold process. Subsequently, the buttons 304 or keys 504 can be bonded to the substrate layer 604 or to one or parts of the substrate layer 604a, 604b, 604c using an adhesive, heat staking, or another bonding method. In one or more embodiments, the buttons 304 or keys 504 and substrate layer 604 or parts of the substrate layer 604a, 604b, 604c can be made in a multi-shot mold process.

Each button array panel 302, 502 can include a rigid support 608 or rigid support layer or stiffener. The rigid support 608 can provide support for the button array panel 302, 502. The rigid support 608 can be an elastomer, e.g., a backup elastomer. The elastomer can be insert molded or heat staked. In one or more embodiments, the rigid support 608 can include metal. The rigid support 608 can include one or more openings 610 to receive part, e.g., the underside, of a button 304 or key 504. For example, the openings 610 of the rigid support 608 are adapted to receive the actuator 306, plunger tip 308, or both the actuator 306 and the plunger tip 308 of a button 304 or key 504. The rigid support 608 can be coupled to the substrate layer 604 using an adhesive, heat staking, or another bonding method. In one or more embodiments, the button array panel 302, 502 does not include a rigid support 608. For example, due to the size of the side button array panels 302 and the keypad button array panels 502, the side button array panels 302 may not benefit from a rigid support 608 and the keypad button array panels 502 may benefit from the a rigid support 608.

The button array panel 302, 502 can be made as a single unit, e.g., manufactured or sold as one piece. Thus, if there is a problem with a button array panel 302, 502, the button array panel 302, 502 can be removed from the handheld communication device 100 and a new one can be inserted. The button array panel 302, 502 can be attached to the handheld communication device 100 with or without separate fasteners. For example, the button array panel 302, 502 can be fastened using toe taps, bosses, snaps, or heat stakes (not shown) to attach the button array panel 302, 502 (e.g., the substrate layer 604) to one or more parts of the handheld communication device 100 having a mating counterpart (not shown). In another example, the button array panel 302, 502 can be fastened using one or more screws to attach the button array panel 302, 502 (e.g., the substrate layer 604) to one or more parts of the handheld communication device 100. In one or more embodiments, the top layer, substrate layer, rigid support or any combination thereof, can be used to secure the button array panel 302, 502 to the handheld communication device 100.

Exemplary embodiments have been described hereinabove regarding the implementation of button array panels for handheld communication devices. Various modifications to and departures from the disclosed embodiments will occur to those having skill in the art. The subject matter that is intended to be within the spirit of this disclosure is set forth in the following claims.

What is claimed is:

1. A button array panel for a handheld communication device comprising:
   a first button layer piece that comprises at least two button actuators;
   a second button layer piece that comprises at least one button actuator;
   a first substrate layer bridge piece disposed between and connected to the first button layer piece and the second button layer piece;
   a first substrate layer end piece connected to the first button layer piece coaxially with the first substrate layer bridge piece;
   a second substrate layer end piece connected to the second button layer piece coaxially with the first substrate layer bridge piece;
   a continuous and seamless layer covering each of the first button layer piece, the second button layer piece, the first substrate layer bridge piece, the first substrate layer end piece, and the second substrate layer end piece, the continuous and seamless layer extending over a length of the button array panel.

2. The button array panel of claim 1 wherein the button array panel is a side button array panel.

3. The button array panel of claim 1 wherein each button actuator is a collapsing button having an associated function and full recovery.

4. The button array panel of claim 1 wherein each of the button actuators includes a plunger adapted to interact with a contact during actuation of the button actuator.

5. The button array panel of claim 1 wherein the at least one button actuator includes a plunger adapted to interact with a switch during actuation of the button actuator.

6. The button array panel of claim 1 wherein the first and second button layer pieces are silicon.

7. The button array panel of claim 1 wherein each of the first and second button layer pieces is elastomeric.

8. The button array panel of claim 1 wherein the continuous and seamless layer is an in-mould label film.

9. The button array panel of claim 1 wherein the continuous and seamless layer provides at least one of a metallic and rigid appearance.

10. The button array panel of claim 1 further comprising a rigid support adapted to support the button layer pieces and the substrate layer pieces.

11. The button array panel of claim 9 wherein the rigid support is metal.

12. The button array panel of claim 1 wherein the substrate layer pieces are one of silicon and plastic.

13. The button array panel of claim 1 wherein the substrate layer pieces are adapted to assist in fastening the button array panel to the handheld communication device.

14. The button array panel of claim 1 wherein the button array panel is adapted to be retained in the handheld communication device using at least one screw.

15. The button array panel of claim 1 wherein distal ends of the first and second substrate layer end pieces are curved.

* * * * *